(12) United States Patent
Subash et al.

(10) Patent No.: US 8,386,994 B2
(45) Date of Patent: Feb. 26, 2013

(54) METHOD OF AUTOMATION OF BUSINESS PROCESSES AND APPARATUS THEREFOR

(75) Inventors: Ghaisas Smita Subash, Pune (IN); Ramanathan Venkatesh, Pune (IN)

(73) Assignee: Tata Consultancy Services Ltd. (IN)

( * ) Notice: Subject to any disclaimer, the term of this patent is extended or adjusted under 35 U.S.C. 154(b) by 671 days.

(21) Appl. No.: 12/460,469

(22) Filed: Jul. 20, 2009

(65) Prior Publication Data
US 2009/0319313 A1    Dec. 24, 2009

Related U.S. Application Data

(63) Continuation-in-part of application No. 10/978,552, filed on Nov. 1, 2004, now abandoned.

(30) Foreign Application Priority Data
Nov. 4, 2003    (IN) .................. 1157/MUM/2003

(51) Int. Cl.
*G06F 9/44*    (2006.01)
*G06Q 10/00*    (2012.01)

(52) U.S. Cl. ........ 717/102; 717/100; 717/101; 705/300; 705/301

(58) Field of Classification Search .................. None
See application file for complete search history.

(56) References Cited

U.S. PATENT DOCUMENTS

| | | | |
|---|---|---|---|
| 6,817,008 B2 * | 11/2004 | Ledford et al. .............. 717/102 |
| 7,171,647 B1 * | 1/2007 | Smith et al. .................. 717/105 |
| 7,222,329 B2 * | 5/2007 | Cole et al. .................... 717/101 |
| 7,506,302 B2 * | 3/2009 | Bahrami ....................... 717/100 |
| 7,703,071 B2 * | 4/2010 | Kuester et al. ................ 717/104 |
| 7,849,438 B1 * | 12/2010 | Hemmat et al. .............. 717/102 |
| 8,015,541 B1 * | 9/2011 | Srinivasan et al. ........... 717/104 |
| 8,095,472 B2 * | 1/2012 | Springborn et al. .......... 705/301 |
| 8,219,967 B2 * | 7/2012 | Zhang et al. .................. 717/102 |
| 2003/0208743 A1 * | 11/2003 | Chong et al. .................. 717/106 |
| 2004/0024624 A1 * | 2/2004 | Ciscon et al. .................... 705/7 |
| 2004/0143477 A1 * | 7/2004 | Wolff ............................... 705/9 |
| 2006/0225032 A1 * | 10/2006 | Klerk et al. ................... 717/105 |
| 2006/0253830 A1 * | 11/2006 | Rajanala et al. .............. 717/105 |
| 2011/0295754 A1 * | 12/2011 | Mohamed ..................... 705/300 |

OTHER PUBLICATIONS

Sagheb-Tehrani et al., Software development process: strategies for handling business rules and requirements, Mar. 2002, 5 pages, <http://delivery.acm.org/10.1145/520000/511162/p58-sagheb-tehrani.pdf>.*

I.T. Hawryszkiewycz, A framework for integrating learning into business processes, Oct. 2005, 6 pages, <http://delivery.acm.org/10.1145/1160000/1151684/p23-hawryszkiewycz.pdf>.*

Vrhovnik et al., An approach to optimize data processing in business processes, Sep. 2007, 12 pages, <http://delivery.acm.org/10.1145/1330000/1325922/p615-vrhovnik.pdf>.*

* cited by examiner

*Primary Examiner* — Thuy Dao
(74) *Attorney, Agent, or Firm* — Robert Plotkin, P.C.

(57) ABSTRACT

The invention disclosed relates to the field of requirement specification in application development. This invention provides a system for business process automation which can generate an executable optimized requirements set by capturing the requirements from the users and processing them to create prototypes. Feedback is obtained from external users on the played prototypes to correct and enhance the requirements to obtain an optimized, complete, correct and consistent requirements set. This helps in the successful development of business application with minimal errors in a very short time.

5 Claims, 1 Drawing Sheet

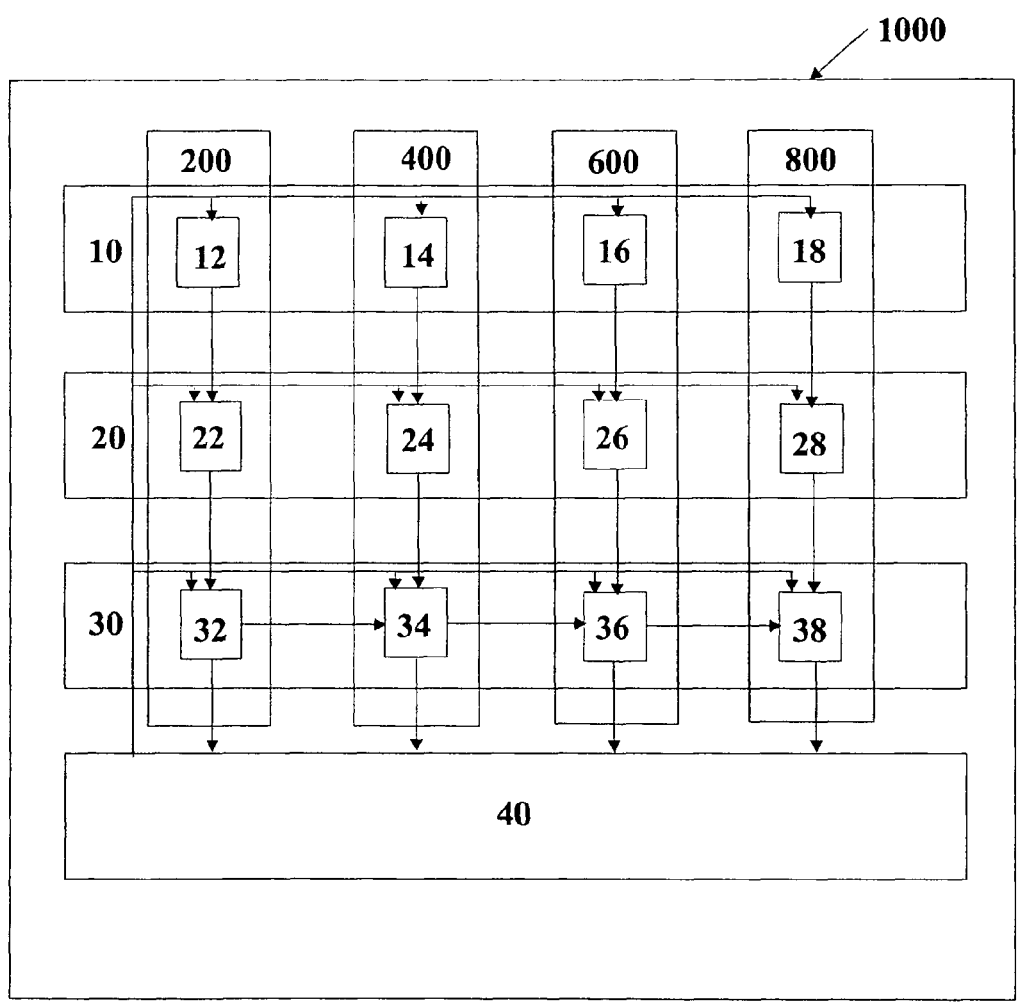

METHOD OF AUTOMATION OF BUSINESS PROCESSES AND APPARATUS THEREFOR

CROSS-REFERENCE TO RELATED APPLICATIONS

This is a continuation in part application to the U.S. patent application Ser. No. 10/978,552, now abandoned, filed, Nov. 1, 2004,which is hereby incorporated by reference in its entirety.

FIELD OF THE INVENTION

The present invention relates to the field of application development. In particular, the present invention relates to the field of requirements definition.

DEFINITIONS

In this specification, the following terms have the following definitions as given alongside. These are additions to the usual definitions expressed in the art.
Internal users is the term used to refer to the users like a requirement analyst who will BUILD the application and who will use the apparatus in accordance with this invention to generate the optimized requirements set.
External users is the term used to refer to the end users of the application.
Functional requirements data include the end users' and customers' requirements with respect to the application functionality.
Modularization related requirements data include requirements related to the logical grouping of functionalities in an application.
Non-functional requirements data include requirements related to performance of the application, peak load capability and the like with respect to customer experience.
Deployment requirements data include requirements related to the final environment in which the application will be running including end to end connectivity, archival details, localization needs, batch frequency, availability and the like.
An optimized requirements set can be defined as a set of verified and validated requirements in terms of consistency, completeness and correctness.

BACKGROUND OF THE INVENTION

For carrying out any task, there are certain requirements which are perceived as necessary and essential for successfully accomplishing the task. These requirements may be inherent in the task to be performed, typically referred to as the problem domain or may be inherent in the implementation, typically referred to as the solution domain.

Business requirements describe in business terms what must be delivered or accomplished by an application to provide value. Product requirements describe the system or product which is one of several possible ways to accomplish the business requirements. Process requirements describe the processes the developing organization must follow and the constraints that they must obey. The product and process requirements are closely linked. For example, a maximum development cost requirement (a process requirement) may be imposed to help achieve a maximum sales price requirement (a product requirement); a requirement for the product to be maintainable (a product requirement) often is traced to by requirements to follow particular development styles (like object-oriented programming), style-guides, or a review/inspection process (process requirements).

A requirements specification is a complete documented description of the behavior of the system to be developed. It includes a set of use cases that describe all the interactions the users will have with the system. Use cases are also known as functional requirements. In addition to use cases, the requirements specification also contains nonfunctional (or supplementary) requirements. Poor requirement specification is a source of many defects in application development.

Different apparatus and methodologies are known for the development of applications. For instance the Rational Unified Process (RUP) prescribes a Use Case-driven approach and defines views for application development. This method addresses software development lifecycle (SDLC), and is very comprehensive. It is a UML (Unified Modelling Language) based method that promotes a use case centric approach. However RUP does not explicitly state or recommend any mechanism to identify a complete set of use cases. The granularity at which a use case should be defined is also left to the choice of an RUP user. There are no specific guidelines on how to ensure completeness and correctness of the use case model arrived at or on establishing consistency between requirements gathered from multiple stakeholders. [Philippe Kruchten, The Rational Unified Process—an Introduction, Addison-Wesley, 1999. 10(4): 13-16, 1997.]

Similarly, the KAOS (Knowledge Acquisition in Automated Specification) approach presents a goal-oriented requirement elaboration method. The method goes by the route of identification, structuring, refinement and formalization of goals. KAOS focuses on formal refinement of high-level goals into system constraints meant as functional requirements. [Axel Van Lamsweerde, Goal-Oriented Requirement Engineering: A guided Tour, Proceedings RE'01, $5^{th}$ IEEE International Symposium on Requirements Engineering, Toronto, August 2001, 249-263.]

Yet another apparatus and method, the Enterprise Knowledge Development (EKD) is a refinement of Enterprise Modelling to accommodate change management. The focus here is on alternate scenarios for change and selection of the most appropriate one. These are goal-driven approaches and they focus largely on the enterprise modelling part of application development [Kerry Raymond, Reference Model of Open Distributed Processing: Introduction]

Another method, 'The Reference Model of Open Distributed Processing—RM-ODP' also uses the notion of viewpoints for this purpose. These are goal-driven approaches and they focus largely on the enterprise modelling part of application development. [Colette Rolland and Naveen Prakash, From Conceptual Modelling to Requirements Engineering, Annals of Software Engineering, 10, 151-176, 2000. This method too lacks explicit focus on requirements.

'The Zachman framework' organizes development processes around the points of view taken by the various players in the business environment and the things they must take into account and represents each of these as cells in a matrix. [J. A. Zachman, A Framework for information systems architecture', IBM Systems Journal, vol 26 no 3, 1987]. This framework does not have an explicit focus on requirements and does not take into account the complete software development life cycle and therefore does not offer any specific guidelines in the process of application development and planning.

All of the above approaches have a consensus on the fact that requirements must be done right, but they do not recommend any approach that addresses the 'how' part. How do we make requirements better in terms of consistency, completeness and correctness is still left to the practitioners of the method. Most of the tools in requirements space address requirement management problem—which means they assume that requirements are in place and they only need to be managed better. But in reality, the problem starts at a much earlier stage, at the stage of requirements definition itself.

Therefore there is a need to have an approach that explicitly addresses different types of requirements and offers clear and specific guidelines to meet them through a machine implementable solution.

U.S. Pat. No. 6,571,247—Danno et al describes a method to generate object design information. Resources and business activities to be performed in a business need to be entered hierarchically to generate the design information The disclosure of U.S. Pat. No. 6,571,247 covers only the analysis and design aspects of application development.

U.S. Pat. No. 6,745,381—Ehnebuske et al describes a method and notation to enable an explicit distinction between static and dynamic features of object-oriented models. The methodology does this during the modeling process by capturing the decisions to allow for business driven variability as explicit diagram annotations called control points. The business variable portions of the system of interacting objects are simultaneously captured as objects called business rules.

U.S. Pat. No. 5,996,012—Jarriel et al describes an application builder to generate a configuration management application for use in a computing environment. Application developer creates prototyping data for a particular management application. The prototyping data is used to generate a prototype application.

But there is felt a need for a business process automation system which can generate an executable optimized requirements set which provides requirements driven application development approach;
separates the problem domain and solution domain clearly and identifies four distinct contexts for capturing, analyzing, modeling and prototyping requirements in the course of application development;
renders agility to application development;
provides reliable verification and validation;
makes the application to be delivered with minimal errors using feedback and requirement enhancement.

OBJECTS OF THE INVENTION

It is an object of the present invention to provide a business processes automation system which can generate an executable optimized requirements set.

It is another object of the present invention to provide a business processes automation system which provides requirements driven application development approach.

It is yet another object of the present invention to provide a business processes automation system which separates the problem domain and solution domain clearly and identifies four distinct contexts for capturing, analyzing, modeling and prototyping requirements in the course of application development.

It is yet another object of the present invention to provide a business processes automation system which renders agility to application development.

It is still another object of the present invention to provide a business processes automation system which provides reliable verification and validation.

One more object of the present invention is to provide a business processes automation system which makes the application to be delivered with minimal errors using feedback and requirement enhancement.

SUMMARY OF THE INVENTION

In accordance with the present invention, there is provided a business process automation system for generating an executable optimized requirements set, comprising:

a data acquisition means (DAM) adapted to capture functional requirements data, modularization related requirements data, non-functional requirements data and deployment requirements data provided by internal users based on the inputs obtained from external users and feed said captured data into a functional requirements unit, a functional architecture unit, a technical architecture unit and a deployment architecture unit respectively, said DAM comprising:
  a. a functional requirements acquisition block adapted to capture said functional requirements data;
  b. a functional architecture acquisition block adapted to capture said modularization related requirements data;
  c. a technical architecture acquisition block adapted to capture said non-functional requirements data; and
  d. a deployment architecture acquisition block adapted to capture said deployment requirements data;

a data organization means (DOM) adapted to receive said captured data from at least one of said blocks of said DAM and adapted to classify said captured data to different templates and post said templates to an artifact generation tool to obtain business artifacts, said DOM comprising:
  a. a functional requirement organization block adapted to organize said captured functional requirements data of said functional requirements unit;
  b. a functional architecture organization block adapted to organize said captured modularization related requirements data of said functional architecture unit;
  c. a technical architecture organization block adapted to organize said captured non-functional requirements data of said technical architecture unit; and
  d. a deployment architecture organization block adapted to organize said captured deployment requirements data of said deployment architecture unit;

a data processing means (DPM) adapted to receive said organized data from at least one of said blocks of said DOM, to produce prototypes based on said organized data and to play said prototypes, said DPM comprising:
  a. a functional requirement processing block adapted to process said organized functional requirements data of said functional requirements unit;
  b. a functional architecture processing block adapted to process said organized modularization related requirements data of said functional architecture unit;
  c. a technical architecture processing block adapted to process said organized non-functional requirements data of said technical architecture unit; and
  d. a deployment architecture processing block adapted to process said organized deployment requirements data of said deployment architecture unit; and a feedback means (FM) adapted to receive at least one of corrective or enhancement related feedbacks in respect to said played prototypes from said external users and adapted to provide corrective signals to at least one of said blocks of said DAM, said DOM and said DPM and adapted to provide enhancement signals to at least one of said blocks of said DAM.

Typically, each of said blocks of said DPM comprises:
a context sensitive alerting means comprising:
  a. a scanning mechanism adapted to receive and scan said organized data from at least one of said blocks of said DOM,
  b. a reference database adapted to store reference data;
  c. a comparator means adapted to compare said scanned data with said reference data; and
  d. a display means to play the alerts; and
a prototyping means adapted to receive said organized data, create machine readable inputs, process said machine readable inputs, create prototypes and play prototypes.

Typically, said DOM is adapted to receive said captured data from each one of said blocks of said DAM.

Typically, said DPM is adapted to receive said organized data from each one of said blocks of said DOM.

In accordance with the present invention, there is provided a business automation process for generating an executable optimized requirements set comprising the following steps:
  capturing functional requirements data, modularization related requirements data, non-functional requirements data and deployment requirements data from internal users based on the inputs obtained from external users;
    organizing said captured data by classifying said captured data into minor elements, populating templates of said minor elements and posting said data to an artifact generation tool to obtain business artifacts;
  processing said organized data received from said templates to produce and play prototypes, comprising the following steps:
    i. creating context sensitive alerts by scanning said organized data for missing elements and comparing said scanned data with the reference data stored in a reference database and playing said alerts; and
    ii. prototyping said organized data by creating machine readable inputs, processing said machine readable inputs, creating prototypes and playing said prototypes;
  receiving at least one of corrective or enhancement related feedbacks in respect to said played prototypes from said external users;
  providing corrective signals to at least one of the blocks of a data acquisition means (DAM), a data organization means (DOM) and a data processing means (DPM) and providing enhancement signals to at least one of said blocks of said DAM; and
  repeating said step of organizing, said step of processing, said step of receiving feedbacks, said step of providing corrective and enhancement signals till said executable optimized requirements set is obtained.

BRIEF DESCRIPTION OF THE ACCOMPANYING DRAWINGS

The business process automation system in accordance with this invention is now described with the help of accompanying drawing, in which:

FIG. 1 illustrates the block diagram of the business process automation system.

DETAILED DESCRIPTION OF THE INVENTION

The drawing and the description thereto are merely illustrative of a business process automation system in accordance with this invention and only exemplify the process and system of the invention and in no way limit the scope thereof.

The system in accordance with the present invention ensures that the problem domain addresses business requirements while the solution domain addresses the technical requirements. The requirement models in the problem domain capture business objectives, (rules+policies) and processes that implement the objectives as well as enterprise architecture that must support the objectives. These models contain sufficient details and the precision to enable tool-assisted analysis and simulation.

The system in accordance with the present invention provides for separation of problem domain and solution domain through classification of requirements. The separation of the problem domain and solution domain is done clearly by identifying four distinct contexts based on types of requirements for capturing, analysing, modeling and prototyping the requirements. This separation of functional and technical concerns helps the application developer to adapt to changing requirements efficiently and thus rendering agility to the application development. The approach in accordance with this invention makes it easy to address and find solutions to the changes in different types of requirements independently and parallely by persons with different skill-sets. For instance:
  functional requirement analysts can confine changes in business requirements to problem domain models without having to deal with their platform-specific impact; and
  technical developers can focus on exploring technical architectural solutions without having to worry about the business functionality.

This invention also provides for clear definition of artifacts, their content, completeness, consistency and correctness. Detecting inconsistencies in requirements captured from different users can help in consolidating the specification. Model checkers can be used to automatically detect inconsistencies.

The solution domain has a model in which non-functional requirements and the state-of-the-art technology are addressed to define an implementation platform. The models of the problem domain are automatically transformed into an implementation on the deployment platform by applying design patterns, strategies and guidelines.

Referring to the accompanying drawing, FIG. 1 illustrates the block diagram of the business process automation system in accordance with the present invention, indicated generally by the reference numeral 1000. The main components of the system 1000 are a data acquisition means (DAM) 10, a data organization means (DOM) 20, a data processing means (DPM) 30, a feedback means (FM) 40, a functional requirement unit (FRU) 200, a functional architecture unit (FAU) 400, a technical architecture unit (TAU) 600 and a deployment architecture unit (DAU) 800. The functional requirement unit (FRU) 200 and the functional architecture unit (FAU) 400 address the problem domain and the technical architecture unit (TAU) 600 and the deployment architecture unit (DAU) 800 address the solution domain.

The DAM 10 has four blocks namely a functional requirements acquisition block (FRAB) 12, a functional architecture acquisition block (FAAB) 14, a technical architecture acquisition block (TAAB) 16 and a deployment architecture acquisition block (DAAB) 18. The DOM 20 has four blocks namely a functional requirements organization block (FROB) 22, a functional architecture organization block (FAOB) 24, a technical architecture organization block (TAOB) 26 and a deployment architecture organization block (DAOB) 28. The DPM 30 has four blocks namely a functional requirements processing block (FRPB) 32, a functional architecture processing block (FAPB) 34, a technical architecture processing block (TAPB) 36 and a deployment architecture processing block (DAPB) 38.

The functional requirement unit (FRU) 200 envelops the functional requirements acquisition block (FRAB) 12, the functional requirements organization block (FROB) 22 and the functional requirements processing block (FRPB) 32. The functional architecture unit (FAU) 400 envelops the functional architecture acquisition block (FAAB) 14, the functional architecture organization block (FAOB) 24 and the functional architecture processing block (FAPB) 34. The technical architecture unit (TAU) 600 envelops the technical architecture acquisition block (TAAB) 16, the technical architecture organization block (TAOB) 26 and the technical architecture processing block (TAPB) 36. The deployment architecture unit (DAU) 800 envelops the deployment architecture acquisition block (DAAB) 18, the deployment architecture organization block (DAOB) 28 and the deployment architecture processing block (DAPB) 38.

The FRAB 12 of the DAM 10 captures functional requirements data from the users, who typically are the requirement analysts. Requirement analysts constitute just one type of hands on users who include process designers, component designers, developers, testers and the like. The requirement analysts provide data to FRAB 12 according to the inputs they receive from the external users who are the end users/customers. Also, the managers can provide to FRAB 12 the data related to the tasks for the hands on users, budget related details and the like. The hands on users and managers are collectively referred to as internal users. Similarly, the FAAB 14 of the DAM 10 captures modularization related requirements data, the TAAB 16 of the DAM 10 captures non-functional requirements data and the DAAB 18 of the DAM 10 captures deployment requirements data.

The FROB 22 of the DOM 20 receives the captured functional requirements data from the FRAB 12 of the DAM 10. It then organizes the captured data by classifying them into minor elements including the business goals, stakeholders' expectations, product requirements and the like. The details of these elements of the functional requirements are populated to their corresponding templates. The FROB 22 of the DOM 20 co-operates with a first database storing tasks and validations for populating the templates if the FRAB 12 of the DAM 10 had captured the corresponding requirements from a hands on user. The FROB 22 of the DOM 20 co-operates with a second database storing goals of the organization, business rules, policies of the organization and the operation of the business for populating the templates if the FRAB 12 of the DAM 10 had captured the corresponding requirements from a manager.

These templates are then posted into artifact generating tools like MasterCraft or Rational Rose using industry specific standards for obtaining the business artifacts including use case diagrams, activity diagrams, class diagrams and the like. The diagrams are created using the following steps.

Business processes are grouped using a suitable criterion such as departments in an organization, process owners and the like. These are represented using the package diagrams in UML.

Business processes are elucidated by identifying process steps and actors involved. These are represented using activity diagrams in UML.

Tasks to be performed by hands on users are represented by use case diagrams in UML. Additionally, used templates are used to document detailed use cases including pre and post conditions, validations and the like.

The static structure of an application is represented using business entity models. The business entity model also includes cardinality constraints. This can be shown using class diagram notation of UML. Rules can be shown as constraints in a class diagram.

Similarly, the FAOB 24 of the DOM 20 receives and organizes the captured modularization related requirements data from the FAAB 14 of the DAM 10. The modularization related requirements data are further classified by the FAOB 24 of the DOM 20 into minor elements including functional scope boundary identification, component development decisions, component responsibilities, component definitions, component interdependencies and the like to fill their respective templates. Corresponding to the data from hands on users, the FAOB 24 of the DOM 20 co-operates with a third database storing component functionality and interdependencies. Corresponding to the data from managers, the FAOB 24 of the DOM 20 co-operates with a fourth database storing functional scope boundaries, component identification and organizational structure.

Further, the TAOB 26 of the DOM 20 receives and organizes the captured non-functional requirements data from the TAAB 16 of the DAM 10. The non-functional requirements data are further classified by the TAOB 26 of the DOM 20 into minor elements including performance requirements, transaction related targets, workload estimation, GUI design, security requirements, data migration, architecture selection, technical architecture solution, platform choices, design decisions, mapping of business components to technical architecture, component interfaces, class design and the like to fill their respective templates. Corresponding to the data from hands on users, the TAOB 26 of the DOM 20 co-operates with a fifth database storing performance requirements, graphic user interfaces, work load and data migration. Corresponding to the data from managers, the TAOB 26 of the DOM 20 co-operates with a fifth database storing performance requirements, graphic user interfaces, work load, data migration and security details.

Still further, the DAOB 28 of the DOM 20 receives and organizes the captured deployment requirements data from the DAAB 18 of the DAM 10. The deployment requirements data are further classified by the DAOB 28 of the DOM 20 into minor elements including physical architecture, roll out plan, configuration management, installation, initial set up, data archival and-back-up strategy, support structure and the like to fill their respective templates. Corresponding to the data from hands on users, the DAOB 28 of the DOM 20 co-operates with a sixth database storing release plans, roll out plans, configuration management strategies, installation process building tools and data archival and back up. Corresponding to the data from managers, the DAOB 28 of the DOM 20 co-operates with a seventh database storing availabilities, remote access and support structures.

The DPM 30 receives the organized data from the blocks of the DOM 20, to produce prototypes based on the organized data and to play the prototypes. The FRPB 32 of the DPM 30 processes the organized functional requirements received from the FROB 22 of the DOM 20. The FAAB 34 of the DPM 30 processes the organized modularization related requirements data received from the FAOB 24 of the DOM 20. The TAAB 36 of the DPM 30 processes the organized non-functional requirements data received from the TAOB 26 of the DOM 20. The DAAB 38 of the DPM 30 processes the organized deployment requirements data received from the DAOB 28 of the DOM 20. Each of the blocks of the DPM 30 has i) a context sensitive alerting means having a scanning mechanism for scanning the organized data for any missing elements, a reference database adapted to store reference data related to the links and relationships between all the requirement elements, a comparator means adapted to compare said scanned data with said reference data and a display means to play the alerts; and ii) a prototyping means for creating machine readable inputs corresponding to the organized data, for processing these inputs, and creating prototypes using these inputs. The prototyping means also will play the created prototypes.

The feedback means (FM) 40 receives corrective feedback and enhancement feedback from the external users who had reviewed the played prototypes. Corrective feedback includes suggestions for fixing any gap or missing entity in the business flow. Corrective feedback signals will be provided to any/all of the blocks of the DAM 10, DOM 20 and DPM 30 for repeating the whole exercise till the gap is filled. Corrective feedback can also be provided by internal users. Enhancement feedback includes suggestions from external users for additional business entities/requirements to be included in the business process. Enhancement feedback signals will be provided to any/all of the blocks of the DAM 10 for repeating the whole exercise till the enhancements are incorporated. Thus, the output of the system will be an optimized set of executable requirements.

In accordance with another aspect of the present invention, the tool-set cooperating with the system of this invention is parameterized by design patterns and well-tested strategies and guidelines. Using tool-assisted support for formal specification, analysis and rapid prototyping of requirements, a developer can change requirements when necessary, specify them formally, analyze them and detect inconsistencies in them. Once consolidated, their implementation can be done through automated transformation mechanisms. The requirements posted using UML diagrams are typically translated into formal specifications. The resulting specifications are processed using model checkers. For example, specification language TLA and its associated model checker TLC can be used to verify object models with assertions specifying pre- and post-conditions for operations and invariants. [L. Lamport, Specifying Systems: The TLA+ Language Tools for Hardware and Software Engineers, Addison-Wesley, 2002].

The errors detected by the model checker are caught either as instances of invariant violation or absence of necessary invariants in original specifications. By inspecting the error trace generated, it is possible to locate the source of the error. Several inconsistencies indicating rule violations can be detected out of the original informal specifications.

Using tool-assisted support for formal specification and by analysis and rapid prototyping of requirements, a developer can change requirements when necessary, specify them formally, analyze them and detect inconsistencies in them.

In accordance with another aspect of the present invention, the project planning can also be done around baselines for each of the main units, defined as follows. The functional requirement unit baseline comprises requirements that correspond to some of the core business processes and critical scenarios. Correspondingly, the functional architecture unit baseline includes business components necessary for incorporation of the business processes identified in the functional requirement unit baseline. The technical architecture unit baseline comprises technical architecture components necessary for implementation of the functional requirement unit and functional architecture unit baselines. The deployment architecture unit baseline includes partial physical architecture necessary for deployment of the baselined solution.

In accordance with the present invention, the business automation process for generating an executable optimized requirements set can be summarized in the following steps:

capturing functional requirements data, modularization related requirements data, non-functional requirements data and deployment requirements data from internal users based on the inputs obtained from external users;

organizing the captured data by classifying the captured data into minor elements, populating templates of the minor elements and posting the data to an artifact generation tool to obtain business artifacts;

processing the organized data received from the templates to produce and play prototypes, comprising the following steps:

iii. creating context sensitive alerts by scanning said organized data for missing elements and comparing the scanned data with the reference data stored in a reference database and playing the alerts; and iv. prototyping the organized data by creating machine readable inputs, processing the machine readable inputs, creating prototypes and playing the prototypes;

receiving at least one of corrective or enhancement related feedbacks in respect to the played prototypes from the external users;

providing corrective signals to at least one of the blocks of a data acquisition means (DAM), a data organization means (DOM) and a data processing means (DPM) and providing enhancement signals to at least one of the blocks of the DAM; and repeating the step of organizing, the step of processing, the step of receiving feedbacks, the step of providing corrective and enhancement signals till the executable optimized requirements set is obtained.

EXAMPLE

A simple "library management" example is presented here to illustrate the approach in accordance with this invention to the application development. The details presented here are representative and not comprehensive.

A library maintains a collection of books. Members of a library borrow and return books. On return of a book, if there are pending claims for the title, the book is held for one of the claimants. The stakeholders are divided into two broad categories-managerial users and hands-on users. Inputs from representatives of both the sets of users are captured. The managerial users typically help specify invariants of the application while the hands-on users will help specify possible interactions with the application to be developed. The librarian is a representative managerial user and library clerk and borrowers form the hands-on users.

Some examples for the four different types of requirement data corresponding to the managerial and hands on users captured by DAM 10 are given below:

By FRAB 12:
  Book borrowing process (from librarian)
  Querying availability of a title (from borrower)
  Calculation of fine for defaulters (from clerk)

By FAAB 14:
  Existing systems with which the library system has to interact (from librarian)

By TAAB 16:
  Response time preference (from borrower)

By DAAB 18:
  Remote access (from librarian)

DOM 20 organizes the captured requirements by DAM 10 according to the business rules. The actions performed by the different blocks are given below:

FROB 22:

The process steps corresponding to each of the business rules and validations are determined here. For instance, in the book borrowing process, a rule can be like 'a book can be issued to only one person'. A second rule can be 'an available book shall be held for a claimant if any'. Two process steps identified to be satisfying the above rules are:
  a. On Borrow: If the book is available, issue the book. If the book is not available, put a claim for the book; and
  b. On Return: If there is no claim, make the status of the book as available. If there is a claim, keep the book on hold for the claimant.

FAOB 24: Mapping of processes to the components are done by FAOB 24. Also, the interactions between different components are determined here. For instance, the book management system has to interact with an accounts management system for the purchase of a new book.

TAOB 26: This block organizes the quantified technical requirements such as performance and usability. Certain examples include the possible number of concurrent system users and the requirements on availability and response time.

DAOB 28: This block organizes post delivery requirements.

DPM 30 processes the organized requirements by DOM 20 to generate the prototypes. FRPB 32 generates prototypes for functionalities including title search, book reservation and the like. Missing alerts are generated if for a particular requirement (title search), stake holder expectation is not captured. FAPB 34 takes care of the prototyping of functionalities like connecting to a remote library system for title search and sending/receiving data to the remote library system. Missing alerts are generated for blank components with no use case allocated and for similar scenarios. TAPB 36 creates prototypes for functionalities like demonstrating peak load capabilities of a use case. Alerts are generated if no peak load requirement is specified. DAPB 38 creates prototypes for functionalities like demonstration of 24/7 availability of the library system.

FM 40 validates the generated prototypes with the external users. Corrective feedback is obtained if the external users find out gaps in the prototyped business flow. For example, when a field is found to be missing in the displayed result set for a title search. Enhancement feedback is obtained if the external user has some suggestions to improve the business flow (for example, if a user would like the system to have an interface with another international library).

TECHNICAL ADVANCEMENTS

The business processes automation system in accordance with this invention:
 separates problem domain and solution domain clearly;
 identifies four distinct contexts for capturing, analyzing, modeling and prototyping requirements; and
 ensures consistency checks between requirements captured from managers/business process owners and hands-on users.
 Types of requirements have been used as the basic distinguishing criteria for defining the four distinct context by this business processes automation system.
 Tool-assisted transitioning of requirement models to an implemented solution on a deployment platform by this business processes automation system
 enables developers to manage change locally within each viewpoint;
 renders agility;
 The business processes automation system in accordance with this invention focuses on quality throughout the development cycle
 by clearly outlining V&V in each viewpoint; and
 testing artifacts produced by each viewpoint independently.

While considerable emphasis has been placed herein on the structures and structural interrelationships between the component parts of the preferred embodiments, it will be appreciated that many embodiments can be made and that many changes can be made in the preferred embodiments without departing from the principals of the invention. These and other changes in the preferred embodiment as well as other embodiments of the invention will be apparent to those skilled in the art from the disclosure herein, whereby it is to be distinctly understood that the foregoing descriptive matter is to be interpreted merely as illustrative of the invention and not as a limitation.

The invention claimed is:

1. A business process automation system, stored in a non-transitory computer-readable medium, for generating an executable optimized requirements set, comprising:
  a data acquisition means (DAM) adapted to capture functional requirements data, modularization related requirements data, non-functional requirements data and deployment requirements data provided by internal users based on the inputs obtained from external users and feed said captured data into a functional requirements unit, a functional architecture unit, a technical architecture unit and a deployment architecture unit respectively, said DAM comprising:
    a. a functional requirements acquisition block adapted to capture said functional requirements data;
    b. a functional architecture acquisition block adapted to capture said modularization related requirements data;
    c. a technical architecture acquisition block adapted to capture said non-functional requirements data; and
    d. a deployment architecture acquisition block adapted to capture said deployment requirements data;
  a data organization means (DOM) adapted to receive said captured data from at least one of said blocks of said DAM and adapted to classify said captured data to different templates and post said templates to an artifact generation tool to obtain business artifacts, said DOM comprising:
    a. a functional requirement organization block adapted to organize said captured functional requirements data of said functional requirements unit;
    b. a functional architecture organization block adapted to organize said captured modularization related requirements data of said functional architecture unit;
    c. a technical architecture organization block adapted to organize said captured non-functional requirements data of said technical architecture unit; and
    d. a deployment architecture organization block adapted to organize said captured deployment requirements data of said deployment architecture unit;
  a data processing means (DPM) adapted to receive said organized data from at least one of said blocks of said DOM, to produce prototypes based on said organized data and to play said prototypes, said DPM comprising:

a. a functional requirement processing block adapted to process said organized functional requirements data of said functional requirements unit;
b. a functional architecture processing block adapted to process said organized modularization related requirements data of said functional architecture unit;
c. a technical architecture processing block adapted to process said organized non-functional requirements data of said technical architecture unit; and
d. a deployment architecture processing block adapted to process said organized deployment requirements data of said deployment architecture unit; and a feedback means (FM) adapted to receive at least one of corrective or enhancement related feedbacks in respect to said played prototypes from said external users and adapted to provide corrective signals to at least one of said blocks of said DAM, said DOM and said DPM and adapted to provide enhancement signals to at least one of said blocks of said DAM.

2. A business process automation system as claimed in claim (1), wherein each of said blocks of said DPM comprising:

a context sensitive alerting means comprising:
a. a scanning mechanism adapted to receive and scan said organized data from at least one of said blocks of said DOM,
b. a reference database adapted to store reference data;
c. a comparator means adapted to compare said scanned data with said reference data; and
d. a display means to play the alerts; and a prototyping means adapted to receive said organized data, create machine readable inputs, process said machine readable inputs, create prototypes and play prototypes.

3. A business process automation system as claimed in claim (1), wherein, said DOM is adapted to receive said captured data from each one of said blocks of said DAM.

4. A business process automation system as claimed in claim (1), wherein, said DPM is adapted to receive said organized data from each one of said blocks of said DOM.

5. A business automation process, executed by a processor, for generating an executable optimized requirements set, the business automation process comprising the following steps:

(1) at a data acquisition means (DAM), capturing functional requirements data, modularization related requirements data, non-functional requirements data and deployment requirements data provided by internal users based on the inputs obtained from external users and feeding said captured data into a functional requirements unit, a functional architecture unit, a technical architecture unit and a deployment architecture unit respectively, said capturing comprising:

a. at a functional requirements acquisition block, capturing said functional requirements data;
b. at a functional architecture acquisition block, capturing said modularization related requirements data;
c. at a technical architecture acquisition block, capturing said non-functional requirements data; and
d. at a deployment architecture acquisition block, capturing said deployment requirements data;

(2) at a data organization means (DOM), receiving said captured data from at least one of said blocks of said DAM, classifying said captured data to different templates, and posting said templates to an artifact generation tool to obtain business artifacts, said DOM receiving, classifying, and posting comprising:

a. at a functional requirement organization block, organizing said captured functional requirements data of said functional requirements unit;
b. at a functional architecture organization block, organizing said captured modularization related requirements data of said functional architecture unit;
c. at a technical architecture organization block, organizing said captured non-functional requirements data of said technical architecture unit; and
d. at a deployment architecture organization block, organizing said captured deployment requirements data of said deployment architecture unit;

(2) at a data processing means (DPM), receiving said organized data from at least one of said blocks of said DOM, producing prototypes based on said organized data, and playing said prototypes, said receiving, producing, and playing comprising:

a. at a functional requirement processing block, processing said organized functional requirements data of said functional requirements unit;
b. at a functional architecture processing block, processing said organized modularization related requirements data of said functional architecture unit;
c. at a technical architecture processing block, processing said organized non-functional requirements data of said technical architecture unit; and
d. at a deployment architecture processing block, processing said organized deployment requirements data of said deployment architecture unit; and (3) at a feedback means (FM), receiving at least one of corrective or enhancement related feedbacks in respect to said played prototypes from said external users, providing corrective signals to at least one of said blocks of said DAM; and (4) at said DOM and said DPM, providing enhancement signals to at least one of said blocks of said DAM.

* * * * *